Patented Nov. 28, 1939

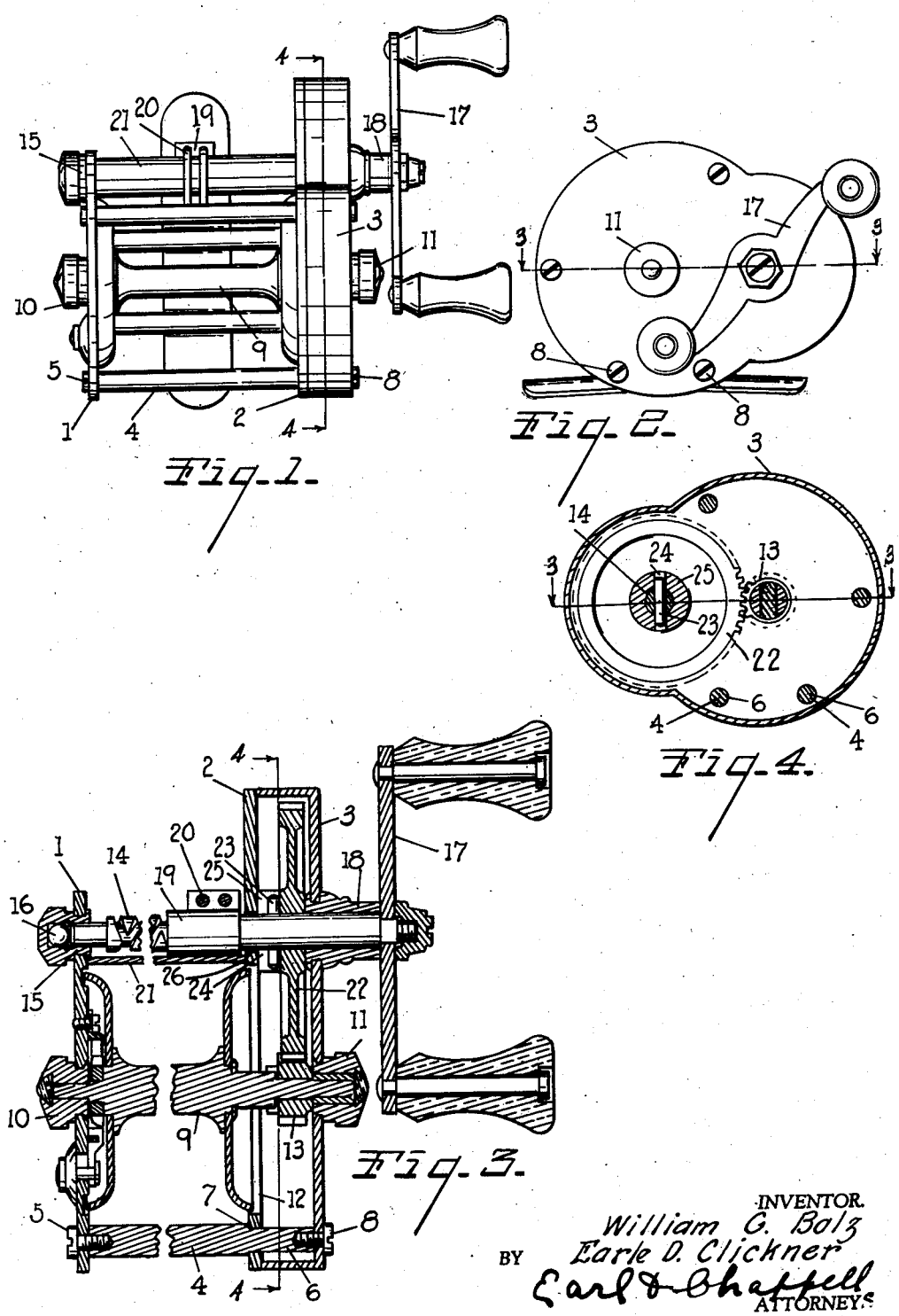

2,181,259

UNITED STATES PATENT OFFICE.

2,181,259

FISHING REEL

William G. Balz and Earle D. Clickner, Kalamazoo, Mich., assignors to Shakespeare Company, Kalamazoo, Mich.

Application August 16, 1937, Serial No. 159,241

4 Claims. (Cl. 242—84.4)

This invention relates to improvements in fishing reels.

The main object of this invention is to provide an improved level winding fishing reel which is simple and economical in structure, having relatively few parts, the parts being arranged and the working parts being supported so that strain and wear thereon in use is minimized.

Objects relating to details of construction and operation will appear from the description to follow. The invention is defined in the claims.

A structure embodying the features of our invention is illustrated in the accompanying drawing, in which:

Fig. 1 is a top or plan view of a fishing reel embodying the invention.

Fig. 2 is an end view thereof, looking from the right of Fig. 1.

Fig. 3 is a view mainly in section taken on line 3—3 of Figs. 2 and 4.

Fig. 4 is a sectional view taken on line 4—4 of Figs. 1 and 3.

In the embodiment of the invention illustrated in the accompanying drawing, we provide a tail plate 1, a head plate 2, and a head cap 3 which coacts with the head plate to form a gear box or housing. Pillars 4 are disposed in abutting relation to the inner side of the tail plate, and are secured thereto by screws 5 tapped into the end of the pillars. The pillars have reduced ends 6 providing shoulders 7 against which the head plate 2 rests. These pillars abut the inner side of the head cap and retaining screws 8 tapped into the head ends of the pillars secure the parts in assembled relation while permitting the removal of the head cap should occasion require.

A spool 9 is supported at the tail end on the bearing 10 carried by the tail plate and at the head end by the bearing 11 on the head cap. The head plate has an opening 12 receiving one flange of the spool and through which the spool may be removed if desired. The spool is provided with a pinion 13. The reversely threaded traversing shaft 14 is supported at its tail end on the bearing 15 of the tail plate, an end thrust bearing ball being provided to receive the end thrust of the traversing shaft, which is very desirable because of the fact that the crank 17 is mounted directly upon the end of the traversing shaft. The head end of the traversing shaft is supported by the bearing 18 on the head cap.

The line guide carriage 19 is provided with a suitable shaft engaging pawl, not illustrated, and with a line guide eye 20 which projects upwardly from the traversing shaft housing or guard 21.

The spool driving gear 22 is arranged on the traversing shaft, and in the embodiment illustrated the driving connection from the gear to the shaft consists of the transverse pin 23 on the shaft which engages the transverse slot 24 in the hub 25 of the gear. The hole 26 in the end plate through which the traversing shaft extends is of such dimension that there is no bearing engagement of the shaft therewith and the shaft may be removed therefrom after the carriage has been freed from the shaft. This arrangement provides the supporting bearing for the traversing shaft immediately at the point where the stress of the crank is applied thereto, and the bearing ball or end thrust bearing 16 receives the thrust resulting from the manual manipulation of the crank, so that the strain upon the parts resulting from manipulation of the crank is effectively sustained.

When it is desired to disassemble the reel to provide access to the moving parts, the head cap is released by removing the screws 8. The carriage is then freed from the shaft, whereupon the head cap may be removed with the shaft and gear 22 on the shaft assembled therewith. If it is desired to release the gear from the shaft, the crank is removed from the shaft, when the shaft may be withdrawn from its bearing on the head cap and axially withdrawn from the gear 22. When the head cap is removed, and with it the traversing shaft and gear 22, the spool is freed. Ordinarily, it is unnecessary to remove the gear from the shaft in order to disassemble the parts for effective cleaning, but in the event it is desired to remove it, this can easily be accomplished and the parts reassembled by reversing the steps.

Our improved fishing reel is very economical in its parts and at the same time the structure is strong and rigid. We have illustrated and described an embodiment of our invention which we consider very practical. We have not attempted to illustrate or describe other adaptations which we contemplate as it is believed that this disclosure will enable those skilled in the art to embody or adapt the improvements as may be desired.

Having thus described our invention, what we claim as new and desire to secure by Letters Patent is:

1. In a fishing reel, the combination of head and tail plates, a housing member coacting with said head plate to provide a gear housing, and connecting pillars between said head and tail plates, said head plate and housing member being provided with gear housing enlargements at the front thereof, a spool provided with a pinion, said head plate having an opening receiving a flange of said spool and through which the spool may be inserted and removed, said housing member being provided with a bearing for the head end of said spool, a reversely threaded shaft disposed through an opening in said head plate, bearings for said shaft on said housing member and tail plate, the bearing on said tail plate being provided with a thrust ball with which the end of the shaft coacts, a hand crank on the head end of said shaft, and a gear on said shaft coacting with said spool pinion, said gear having an axially-slotted hub, said driving shaft having a pin, said gear being engaged and disengaged relative to said pin with an axial movement for assembly and disassembly, means for holding said gear from axial movement relative to said pin during use of the reel, said shaft being removable through said opening in said head plate and with said housing member when the housing member is freed from said pillars.

2. In a fishing reel, the combination of head and tail plates, a housing member coacting with said head plate to provide a gear housing, and connecting pillars between said head and tail plates, said head plate and housing member being provided with gear housing enlargements at the front thereof, a spool provided with a pinion, said head plate having an opening receiving a flange of said spool and through which the spool may be inserted and removed, said housing member being provided with a bearing for the head end of said spool, a reversely threaded shaft disposed through an opening in said head plate, bearings for said shaft on said housing member and tail plate, a hand crank on the head end of said shaft, and a gear on said shaft coacting with said spool pinion, said gear having an axially-slotted hub, said driving shaft having a pin, said gear being engaged and disengaged relative to said pin with an axial movement for assembly and disassembly, means for holding said gear from axial movement relative to said pin during use of the reel, said shaft being removable through said opening in said head plate and with said housing member when the housing member is freed from said pillars.

3. In a fishing reel, the combination of head and tail plates, pillars connecting the same, a gear housing member coacting with said head plate to provide a gear housing, a spool journaled in said reel and provided with a pinion disposed interiorly of the gear housing, a traversing shaft journaled in said tail plate and housing member, a hand crank removably secured on the head end of said shaft and in engagement with said housing member, a gear loosely mounted on said shaft meshing with said spool pinion, and axially engageable means on the gear and shaft for securing said gear in angularly fixed relation to the shaft, said means being at the inner side of the gear and coacting with the hand crank in preventing axial separation of the gear and housing member when the latter is removed from the head plate; the housing member, hand crank, gear, and shaft being removable as a unit, and said hand crank being removable from said shaft to permit separation of the gear, shaft, and housing member when desired, said means being readily disengageable for separation of the gear and shaft at such time.

4. In a fishing reel, the combination of head and tail plates, pillars connecting the same, a gear housing member coacting with said head plate to provide a gear housing, a spool journaled in said reel and provided with a pinion disposed interiorly of the gear housing, a traversing shaft journaled in said tail plate and housing member, a hand crank removably secured on the head end of said shaft, and a gear on said shaft meshing with said spool pinion, said shaft and gear having coacting means preventing relative angular movement of the gear and shaft and axial movement of the gear on said shaft inwardly and permitting axial movement of the gear on the shaft in the opposite direction, said housing member coacting with said means in preventing separation of the gear, shaft, and housing member; the housing member, hand crank, gear, and shaft being removable as a unit, and said hand crank being removable from said shaft to permit separation of the gear, shaft, and housing member when desired.

WILLIAM G. BALZ.
EARLE D. CLICKNER.